Feb. 25, 1958　　　　　　　L. R. ZIFFERER　　　　　　　2,824,345
APPARATUS AND METHOD FOR CURING A FORMED GRANULAR ARTICLE
Filed Sept. 5, 1956　　　　　　　　　　　　　　　　2 Sheets-Sheet 1
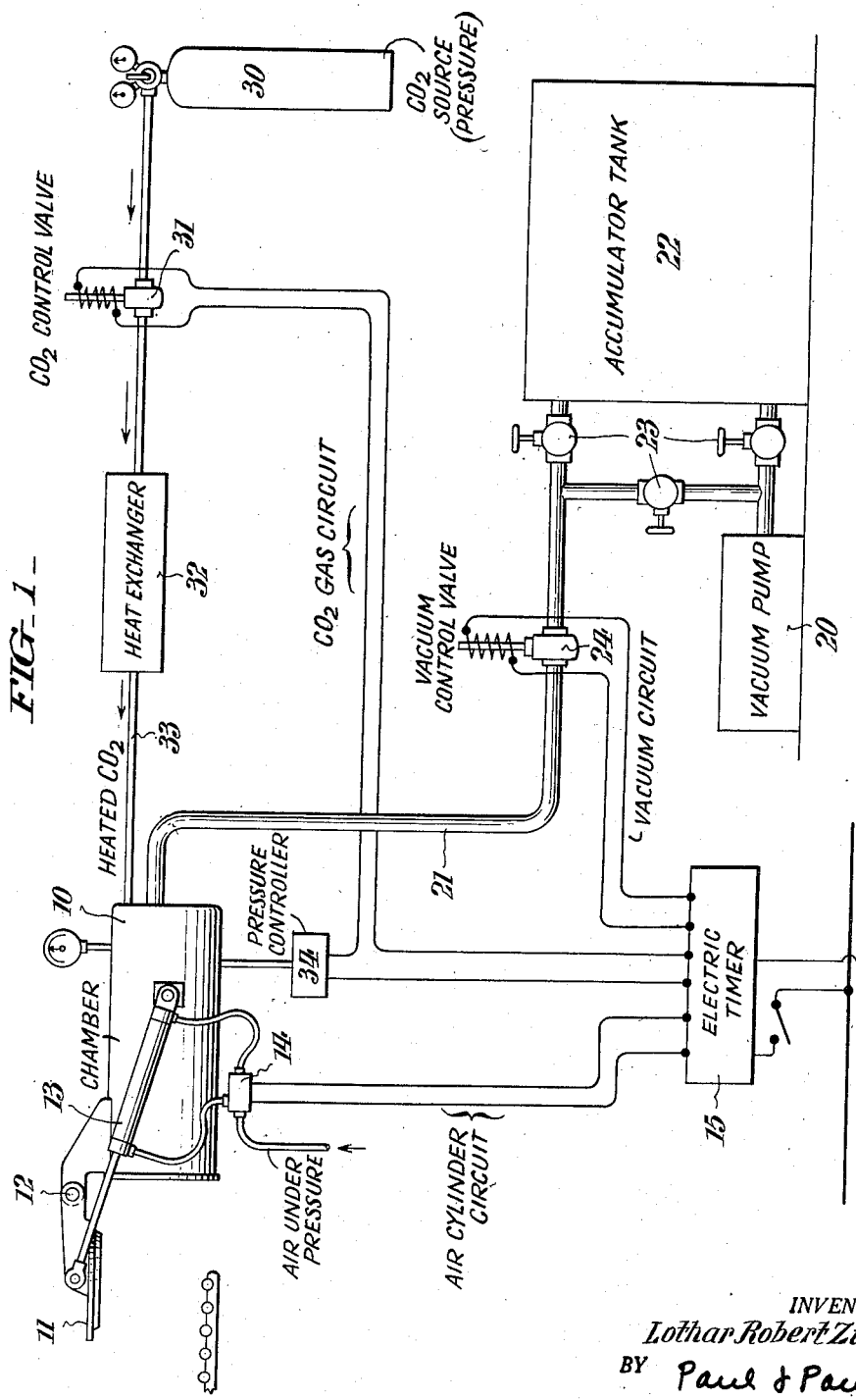
INVENTOR:
Lothar Robert Zifferer,
BY Paul & Paul
ATTORNEYS

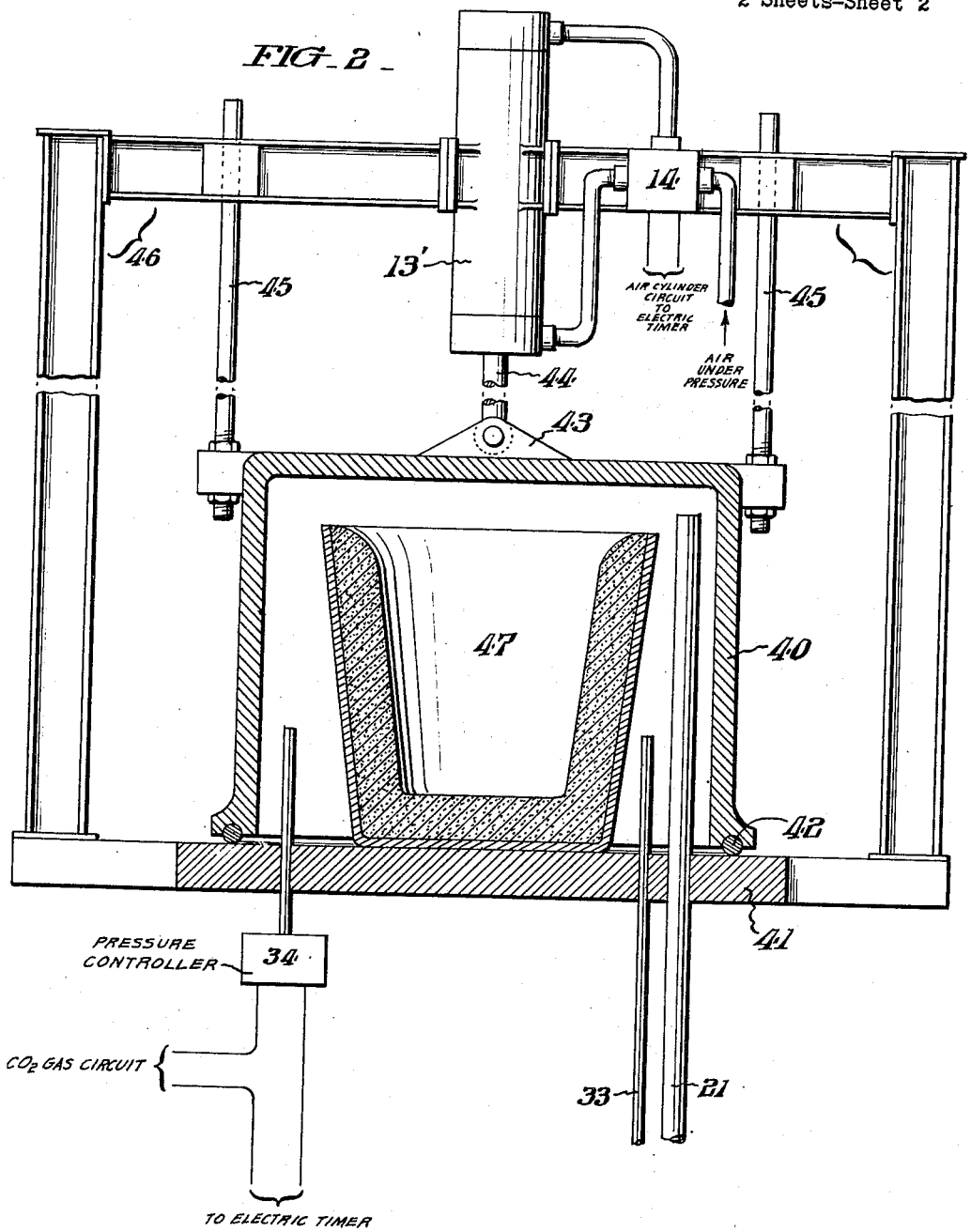

United States Patent Office 2,824,345
Patented Feb. 25, 1958

2,824,345

APPARATUS AND METHOD FOR CURING A FORMED GRANULAR ARTICLE

Lothar Robert Zifferer, Glen Rock, Pa.

Application September 5, 1956, Serial No. 608,096

7 Claims. (Cl. 22—9)

This invention relates to an apparatus and method for curing or setting a molded granular material, such as a mold, core, ladle lining or the like, used in founding operations and herein collectively referred to as a sand form.

It has heretofore been known that sand forms may be made by mixing the granular particles with water glass (sodium silicate) and by forcing carbon dioxide under pressure, either cold or hot, or other gases when hot, into the resulting molded product. The carbon dioxide (chemical cure) reacts chemically with the water glass, producing a silica gel which securely holds the granular particles together. Hot air (or other gas) has been found to provide an excellent thermal cure when applied to sodium silicate in accordance with this invention, while hot carbon dioxide provides a combined thermal and chemical cure. The carbon dioxide-water glass reaction produces sodium carbonate and silica gel.

In practicing the process outlined above, the art has found that good quality may be obtained by forcing carbon dioxide through each core individually (flow-engineering each core), but the process has been difficult to adapt to high production foundries since each core must be processed individually. If the carbon dioxide is not blown into the core, but is instead merely introduced into a chamber with the core, there is a relatively slow penetration of carbon dioxide into the core for reaction with the water glass, and a depletion of carbon dioxide due to reaction with water glass at or near the surface of the core.

It is accordingly an object of this invention to provide an apparatus and method for rapidly producing a plurality of sand forms of high quality. Still another object of this invention is to provide an improved apparatus and method for producing high quality sand forms by reacting carbon dioxide with water glass which is intimately mixed with the solid particles of which the sand forms are made. Other objects and advantages of this invention, including the simplicity and economy of the same, will further become apparent hereinafter and in the drawings, of which:

Fig. 1 represents in schematic form a specific embodiment of this invention, which is particularly adapted to carry out the method in accordance with this invention.

Fig. 2 represents a modified form of this invention, parts being broken away for clarity of illustration.

Referring more particularly to Fig. 1, the number 10 designates an enclosure or chamber having a swinging door 11 pivoted at 12 to the chamber 10. Also pivoted to the chamber are a pair of pneumatic cylinders 13 (one being located behind the chamber 10 and not visible) connected to an air control valve 14, which is arranged to conduct a supply of air under pressure to operate the cylinders 13. Door 11 has no latch and is held closed solely by cylinders 13. An electric timer 15 is suitably connected to a source of electricity and to the valve 14 to regulate the opening and closing of the door 11 in accordance with a predetermined time sequence.

The number 20 designates a vacuum pump connected through piping 21 to the chamber 10. An accumulator tank 22 is provided in the vacuum line, and it can either be connected into the vacuum pump circuit or isolated therefrom by a plurality of valves 23. A vacuum control valve 24 is provided in the vacuum circuit 21, and this valve 24 is electrically operated from the timer 15 by suitable electric connections as shown in the drawing.

The number 30 designates a source of carbon dioxide under high pressure. This pressure may be of the order of 100 lbs. per square inch or more. The carbon dioxide cylinder 30 is connected through a carbon dioxide control valve 31 and a heat exchanger 32 to a carbon dioxide feed line 33 which leads into the chamber 10. The control valve 31 is actuated by electric connections from the timer 15, one such connection passing through a pressure controller 34 such that the control valve 31 is actuated only under predetermined conditions of pressure within the chamber 10.

In accordance with the method of this invention, the form is produced by mixing a plurality of preselected (sand) particles with water glass in such an amount that the surfaces of the particles are completely wetted by the water glass. The resulting mixture is then molded into the desired form and placed into the chamber 10. The electric timer 15 is then started, which electrically operates the valve 14 to close the door 11. The timer 15 then actuates vacuum control valve 24, causing a vacuum to be pulled on the chamber until a vacuum of about 25 to 28 inches of mercury is produced. The vacuum control valve 24 is then automatically closed by the timer 15 after which the carbon dioxide valve 31 is automatically opened, causing carbon dioxide to pass through the heat exchanger 32 and into the chamber. The heat exchanger 32 raises the temperature of the carbon dioxide to about 600 to 800° F. As the carbon dioxide flows into the chamber and reacts with the water glass in the casting, its pressure gradually accumulates until a value of about 1 to 5 pounds per square inch gauge is reached at which time the pressure control switch 34 is actuated, causing the carbon dioxide controlling circuit to close the control valve 31. If additional carbon dioxide is consumed in the chemical reaction with water glass, decreasing the pressure below about one pound per square inch, pressure control switch 34 automatically opens the valve 31 and additional carbon dioxide is permitted to pass through the control valve 31. After treatment with carbon dioxide for a limited period of time (which may be predetermined by making an appropriate setting in the electric timer 15), the electric timer 15 automatically closes the control valve 31 and opens the vacuum control valve 24 keeping said valve 24 open until a vacuum of about 25 to 28 inches of mercury is obtained in the chamber 10. The electric timer 15 then automatically closes the vacuum control valve 24 and opens the carbon dioxide control valve 31, admitting a second charge of hot carbon dioxide to the chamber 10. After treatment for a limited period of time with hot dioxide at about 1 to 5 lbs. per square inch gauge, the electric timer 15 automatically actuates the controller 14, causing the cylinders 13 to open the door 11, after which the finished sand form may be removed.

Turning now to Fig. 2 of the drawings, this figure illustrates a modified form of apparatus in accordance with this invention, which is adapted for the production of relatively large objects, such as ladle linings or the like. The number 40 designates a bell chamber which is reciprocable up and down toward and away from a chamber stage 41, which is stationary. An intervening seal 42 is provided around the lower edge of the bell chamber 40. At its upper end the bell chamber 40 has an ear 43 which is pivoted to the end of a rod 44 actuated by a cylinder 13′, which is the equivalent of the cylinder 13 shown in Fig. 1. The numbers 45, 45 designate guide members which are arranged to guide the bell chamber 40 in its reciprocal movement up and down. The cylinder 13' is supported on a relatively strong framework 46.

The bell chamber 40 is of sufficient size and shape to accommodate rather large objects, such as the ladle lining 47 which appears in Fig. 2. Means are provided for evacuating the bell chamber 40 and for introducing hot carbon dioxide or any other gas, such means constituting the piping 21 and the feed line 33, as previously explained in connection with Fig. 1. Similarly, the other operating connections for the device of Fig. 2 are the same as that for Fig. 1, and are similarly numbered. Some portions of the apparatus shown in Fig. 1 have been eliminated from Fig. 2, but it is to be understood that the connections and the automatic operation of the device of Fig. 2 are intended to be the same as those in Fig. 1.

The operation of the apparatus of Fig. 2 is similar to that of Fig. 1, with the exception of the fact that the bell chamber 40 reciprocates up and down, providing clearance for the insertion and removal of the ladle lining 47. When the vacuum is pulled, the seal 42 serves to seal the space within the chamber. Accordingly, the apparatus of Fig. 2 operates automatically to evacuate the space within the chamber 40, to insert gas, to evacuate, and again to insert gas, all in accordance with the sequence of operations determined by the electric timer.

When single cycle curing is used, as has previously been attempted without substantial success, the curing is ineffective at both high and low degrees of vacuum. At a low vacuum, such as 25 to 27 inches of mercury, for example, the mixture of carbon dioxide with air rapidly becomes depleted in carbon dioxide and the reaction ceases to be self-feeding. Accordingly, only the surface of the treated mass is properly cured. However, at high vacuums in excess of about 29½ inches of mercury, water vapor is formed in the sand mass being treated because of the vapor pressure of water at that high vacuum. Pulling a continuous vacuum for sufficient time causes dehydration of the sodium silicate. Introduction of carbon dioxide gas in the next process stage, subsequent to this dehydration, does yield a satisfactory cure, but the time required for the necessary dehydration at low temperature greatly limits the value of high vacuum, single-cycle curing.

Utilizing multi-cycle curing in accordance with this invention has been found to overcome the problems just discussed. At a relatively low vacuum of about 25 to 27 inches of mercury for example, the water does not boil out of the water glass. The introduction of carbon dioxide which reacts with the sodium silicate to form sodium carbonate and silica gel generates sufficient reaction heat, however, so that the subsequent application of vacuum (in the second stage of the process) does cause water to boil out at a vacuum as low as about 25 to 27 inches of mercury, for example. The relatively high temperature of the reaction zone causes rapid dehydration of the sodium silicate on the second evacuation, so that the second introduction of carbon dioxide encounters very little water vapor and proceeds rapidly. On the other hand, at high vacuum, in excess of about 29½ inches of mercury, some benefit is derived from increased dehydration on the first evacuation, totally independently of the heat of reaction between carbon dioxide and water glass.

Further advantages are obtained in accordance with this invention by utilizing multi-cycle curing at a high temperature. An advantage is gained in introducing heated carbon dioxide instead of cold carbon dioxide after the first evacuation, due to the increased dehydrating effect obtained in the second stage due to the heating effect of the hot gas in the first stage. Large cores and molds (and small ones as well) containing substantial quantities of water are more rapidly cured in depth when the feed consists of heated carbon dioxide as distinguished from cold carbon dioxide. Additionally, the introduction of hot carbon dioxide provides a multi-cycle thermal curing. It is well known that any thermo setting material, admixed with a granular material, can be set or cured by furnace curing at temperatures on the order of 600 to 1200° F. Thermal curing does not depend on a chemical reaction of the type involved when carbon dioxide is contacted with water glass. In effect, thermal curing alters the small percentage of thermo setting material present around each grain of the granular material, without heating the mass being treated to any major extent. An example of the thermal multi-cycling application is the cure of sands bonded by phenolic resins. These materials are used for the production of cores and molds which have heretofore been furnace cured. In accordance with this invention, an excellent form of thermal curing is provided when hot carbon dioxide is conducted, utilizing a multi-cycle process, into a mold or core of sand or other granular material which has been mixed with water glass. Other hot gases, such as hot air for example, may be substituted for hot carbon dioxide and these gases accomplish the thermal curing of the core or mold. However, carbon dioxide at a temperature of about 200 to 1200° F. provides a combined chemical and thermal cure with great efficiency and without sacrifice of quality of the product.

It is desirable for some purposes, however, to feed relatively cold carbon dioxide into the curing chamber. When small cores are being made, it is often desirable to support these cores on relatively inexpensive plastic supports (core driers) within the curing chamber. These plastic core driers also are useful for handling the cores outside the chamber as well. Due to the limited temperature tolerance of the relatively inexpensive plastic driers, it is important to maintain the temperature below about 300° F., and for this purpose it is desirable to utilize relatively cold carbon dioxide as the gas which is fed to the curing chamber.

Although I have just described a method in which the chamber is exhausted, carbon dioxide introduced and this cycle repeated once, it will be appreciated that additional repetitions of the cycle may be made should that be found desirable in any particular case. In applications where large sand masses are being treated, it is often necessary to use a greater number of cycles. However, I have found that a single repetition of the (exhausting) and (carbon dioxide introducing) steps provides exceedingly fast curing of the sand form even though a relatively incomplete vacuum is applied. The results in accordance with this method are radically better than the slow and unsatisfactory results that would be obtained in a single evacuation followed by carbon dioxide introduction, even if the form were left in contact with the carbon dioxide for more than double the contact time necessary to cure the form in accordance with my novel process.

These results are obtained even when an easily-attainable, relatively low vacuum is used, which may have a value as low as about 10–20% of atmospheric pressure (absolute).

The carbon dioxide positive pressure in the chamber shown in Fig. 1 is preferably kept to about 5–40% above atmospheric pressure, since an excessively high pressure requires a special door construction for door 11.

Although this invention may be practiced in conjunction with a wide variety of types of solid particles, it is particularly adaptable to foundry cores, molds and ladle linings, using sand and water glass. Although water glass has been referred to herein as sodium silicate, equivalent silicates, such as ethyl silicate, are intended to be included within the meaning of this term.

The use of the heat exchanger 32 is of importance since the application of hot carbon dioxide at a temperature of 200 to 1200° F. (preferably 600 to 800° F.) speeds up the sodium silicate reaction and also provides economy, since a less dense gas is introduced into the chamber than would be the case if cold carbon dioxide were used. This economy is obtained when the less dense gas is discarded at the completion of the carbon dioxide curing step and followed by the evacuation of the chamber 10. Additionally, hot carbon dioxide gives the sand form a combined chemical and thermal cure which is better than a straight chemical cure.

Although this invention has been described with reference to specific apparatus, it will be appreciated that a wide variety of changes may be made both in the apparatus and method without departing from the scope of this invention. For example, some of the components of the apparatus may be reversed, certain features of the invention may be used independently of others, and equivalents may be substituted for the apparatus and for the method steps, all within the spirit and scope of the invention as defined in the appended claims.

Having thus described my invention, I claim:

1. In a method of curing a molded article, said article comprising a plurality of granular particles mixed with liquid sodium silicate, the steps which comprise placing said article in a closed space, partially evacuating said space, introducing carbon dioxide into said space at approximately atmospheric pressure, thereby maintaining said carbon dioxide in contact with said sodium silicate causing a chemical reaction which produces silica gel and sodium carbonate reaction products, keeping said space closed and again partially evacuating said space, and again introducing carbon dioxide into said space, curing with the sodium carbonate in situ.

2. In a method of making a sand form, the steps which comprise molding sand particles with water glass into the desired shape, placing the molding into an enclosed space, partially evacuating said space to an absolute pressure of about 10-20% atmospheric pressure, introducing carbon dioxide into said space at a pressure of about 5%-40% above atmospheric pressure, thereby maintaining said carbon dioxide in contact with said sodium silicate causing a chemical reaction which produces silica gel and sodium carbonate reaction products, keeping said space closed and again partially evacuating to an absolute pressure of about 10%-20% atmospheric pressure and again introducing carbon dioxide into said space at a pressure of about 5%-40% above atmospheric pressure.

3. Apparatus for making a refractory mold or core comprising a chamber, means for opening and closing said chamber, vacuum means for evacuating said chamber, a source of carbon dioxide under high pressure, means for introducing said carbon dioxide into said chamber, pressure control means for reducing the pressure of said carbon dioxide to a value slightly above atmospheric pressure, and automatic timing means connected to said opening means, said vacuum means and said control means for automatically closing said chamber and then repeatedly and alternately evacuating said chamber and charging it with carbon dioxide, said timing means comprising automatic means for operating said chamber closing means, automatic evacuating means operative in timed relation to said closure for evacuating said chamber, automatic gassing means for closing off said evacuating means and for introducing said carbon dioxide into said chamber when said evacuating means is closed off, pressure control means for regulating the carbon dioxide pressure in said chamber for automatically introducing additional carbon dioxide to replenish the carbon dioxide consumed in the curing reaction, means operative in predetermined timed relation to said gassing means for shutting off said gassing means and for maintaining said chamber closed and for re-evacuating said chamber, further gassing control means for again closing off said evacuating means and introducing said carbon dioxide into said chamber, and chamber opening means connected for operation in predetermined timed relation to said further gassing control means, for opening said chamber.

4. Apparatus defined in claim 3 wherein a vacuum accumulator is provided between said chamber and said evacuating means.

5. Apparatus defined in claim 3 wherein a control valve is positioned in the feed line for carbon dioxide, and wherein a heat exchanger is provided at said feed line intermediate said control valve and said chamber.

6. Apparatus defined in claim 3 wherein a pressure controller is connected to said timer to limit the positive pressure of carbon dioxide to about 1-5 pounds per square inch.

7. The apparatus defined in claim 3 wherein said chamber is provided with a swinging door, a pair of pneumatic cylinders are provided for swinging said door open and closed, and an air control valve is connected in the supply line to said pneumatic cylinder and to said timing means.

References Cited in the file of this patent

UNITED STATES PATENTS

| | | |
|---|---|---|
| 591,168 | Heinzerling | Oct. 5, 1897 |
| 682,140 | Friswell | Sept. 3, 1901 |
| 825,088 | Thom | July 3, 1906 |
| 876,783 | Dresler | Jan. 14, 1908 |
| 898,703 | Thom | Sept. 15, 1908 |
| 1,599,413 | Harrison et al. | Sept. 14, 1926 |
| 1,916,949 | Harrison et al. | July 4, 1933 |
| 2,547,323 | Heuer | Apr. 3, 1951 |